United States Patent [19]

Tonoki et al.

[11] Patent Number: 4,824,509

[45] Date of Patent: Apr. 25, 1989

[54] METHOD FOR PRESSURE LAMINATION UTILIZING FLUID MEDIUM WITH PARTIAL SOLIDIFICATION THEREOF FOR SEALING PRESSURE CHAMBER

[75] Inventors: Kenji Tonoki; Kazuyoshi Tsunoda; Haruki Yokono; Hisao Kono, all of Yuki; Ryoji Yokoyama, Musashino; Fumiaki Nakamura, Shimodate, all of Japan

[73] Assignee: Hitachi Chemical Co., Ltd., Tokyo, Japan

[21] Appl. No.: 818,188

[22] Filed: Jan. 13, 1986

[30] Foreign Application Priority Data

Jan. 11, 1985 [JP] Japan .................................. 60-3662

[51] Int. Cl.[4] ............................................ B32B 31/04

[52] U.S. Cl. ................................ 156/285; 156/307.4; 156/311; 156/323; 156/324; 156/382; 156/436; 264/166; 264/347; 264/348; 264/510; 264/562; 264/570; 425/71; 425/326.1; 425/405.1

[58] Field of Search ...................... 264/40.3, 348, 319, 264/570, 166, 178 R, 179, 347, 510, 557, 562; 156/311, 323, 324, 583.1, 583.5, 498, 285, 307.4, 344, 382, 436; 425/113, 405 R, 71, 326.1, 445

[56] References Cited

U.S. PATENT DOCUMENTS

| | | | |
|---|---|---|---|
| 2,401,642 | 6/1946 | Hiltner et al. | 264/348 |
| 3,439,078 | 4/1969 | Whiteford | 264/570 X |
| 3,527,851 | 9/1970 | Bulgin | 264/40.3 |
| 3,529,050 | 9/1970 | Smith | 425/113 X |
| 3,620,158 | 11/1971 | Torelli et al. | 100/154 |
| 3,811,406 | 5/1974 | Tomlinson | 156/498 X |
| 3,909,177 | 9/1975 | Takaoka et al. | 264/347 X |
| 3,997,288 | 12/1976 | Takaoka et al. | 264/347 X |
| 4,247,271 | 1/1981 | Yonekura et al. | 425/71 X |
| 4,599,128 | 7/1986 | Held | 156/324 X |

FOREIGN PATENT DOCUMENTS

| | | |
|---|---|---|
| 3046431 | 9/1982 | Fed. Rep. of Germany . |
| 2269383 | 11/1975 | France . |

*Primary Examiner*—Jeffery Thurlow
*Assistant Examiner*—Leo B. Tentoni
*Attorney, Agent, or Firm*—Antonelli, Terry & Wands

[57] ABSTRACT

In order to apply pressure and heat to a sheet material as required in the manufacture of a laminated sheet material, the sheet material is conveyed in through an entrance opening of a pressure vessel, along through an interior space thereof, and out through an exit opening thereof, substantially filled with a pressure medium which is maintained at a temperature above its melting point in the interior space of the pressure vessel, but is maintained at a temperature below its melting point in the entrance and exit openings of the pressure vessel, so as to accomplish sealing in such zones by solidification of the pressure medium, whereby enabling continuously to treat a long sheet material under constant application of pressure and heat over a relatively long time period in which respective portions of the sheet material traverse the pressure vessel.

13 Claims, 5 Drawing Sheets

METHOD FOR PRESSURE LAMINATION UTILIZING FLUID MEDIUM WITH PARTIAL SOLIDIFICATION THEREOF FOR SEALING PRESSURE CHAMBER

BACKGROUND OF THE INVENTION

The present invention relates to the field of manufacture of laminates, and more particularly relates to a method and a device for making a laminated plate, for example of a type which can be utilized as electrical insulation material.

In the prior art, for making a laminated plate such as a synthetic resin laminated plate, a suitable number of sheets of base material impregnated with thermosetting resin have been stacked together, and these sheets have then been laminated together, either by passing them between pressure rollers as exemplarily shown in a schematic side view in FIG. 1 of the accompanying drawings, or by pressing them in an open press as each being sandwiched between platens and pressed together, as exemplarily shown in a schematic frontal view in FIG. 2 of said accompanying drawings.

In more detail, in FIG. 1, the reference numeral 1 denotes sheets of a material such as for example stainless steel plate, aluminum foil, plastic film, or the like, which is used for protecting the material to be laminated during the lamination process, and the reference numeral 2 denotes a plurality of overlaid sheets of so called "prepreg" (this term will be used henceforward throughout this specification), which are to be laminated together. This prepreg may be made, for example, by impregnating natural or synthetic, organic or inorganic, woven or non woven fabric, cloth sheet material, such as paper, glass cloth, non woven glass cloth, asbestos cloth, polyester fiber cloth, or the like, with synthetic resin varnish or liquid synthetic resin such as phenol resin, epoxy resin, polyester resin, polyimide resin, silicon resin, or the like, and by then curing the synthetic resin into B-stage by heating/drying. The reference numeral 3 is used to denote each one of a plurality of heating and pressure rollers. Two sheets of the protective sheet material 1 are laid one on each side of a plurality of layers of the prepreg 2, and the thus formed sandwich of sheets of protective material 1 on either side of prepreg 2 is passed in sequence between a plurality of opposed pairs of these rollers 3 and is heated and compressed thereby, thus causing the prepregs 2 to be laminated together to form a laminated plate.

On the other hand, in the FIG. 2 apparatus, the reference numeral 4 is used to denote each of a plurality of platens which can be heated or cooled by a heating or cooling means incorporated therein, while 5 is an upper plate, 6 are support columns, 7 is a movable plate, 8 is a fixed base portion, 9 is a pressure piston, 10 is a pressure chamber, 11 is a hydraulic fluid inlet, and 12 is a hydraulic fluid outlet. The fixed base portion 8 supports the columns 6 to the tops of which the upper plate 5 is fixed, and the movable plate 7 is slidably mounted on the columns 6 and is selectively movable up and down said columns 6 by the operation of the hydraulic device constituted by the pressure piston 9 and the pressure chamber 10. When hydraulic fluid is supplied under pressure (from a pump and under the control of a control means which are not particularly shown in the figure) through the hydraulic fluid inlet 11 to the pressure chamber 10, then the pressure piston 9 is raised, thus raising the movable plate 7; but, on the other hand, when hydraulic fluid is drained through the hydraulic fluid outlet 12 from the pressure chamber 10, then the pressure piston 9 is lowered, thus lowering the movable plate 7. The uppermost one of the platens 4 is mounted to the lower surface of the upper plate 5, while the lowermost one of said platens 4 is mounted to the upper surface of the movable plate 7; and the other ones of said platens 4 are arranged in a vertically spaced and movable manner by a plurality of stoppers (not particularly shown in the drawing) between said upper plate 5 and said movable plate 7.

The material to be laminated, i.e. the prepreg, is cut into pieces of apporpriate size, and then an appropriate number of such sheets are pressed together between mirror plates, and a certain number (from a few to some tens) of such assemblies are combined together and are introduced between the platens 4, although this matter is not particularly shown in the figure. Then, as explained above, hydraulic fluid is supplied under pressure through the hydraulic fluid inlet 11 to the pressure chamber 10, and the pressure piston 9 and the movable plate 7 are raised towards the upper plate 5, thus squeezing together the platens 4 and the prepreg assemblies. At the same time, the platens 4 are heated; this maybe be done by forming said platens 4 with passages through which steam or the like is passed, but no such arrangements are particularly shown in the figures. Thus, the heat required for the compression molding and lamination is provided, and the prepreg sandwiches are heated and compressed, thus laminating them to form laminated plates.

In the case of the first one of these lamination processes as illustrated in FIG. 1, laminated plates of great length can be produced and the process can be operated continuously, but the process is applicable only to types of synthetic resin which require only a relatively short curing time by heat and pressure, since the laminate passes relatively quickly between each pair of rollers 3 and the whole area thereof is therefore not pressurized for a long time period. Since, however, most synthetic resins require at least several minutes of heating and pressuriziation for being molded and laminated, this first lamination process is not widely applicable nowadays, and rollers are usually only used for bonding laminate layers.

In the case of the second one of these lamination processes as illustrated in FIG. 2, high pressure and temperature can be applied over substantially the entire surface of the laminate for any desired time; but this type of flat press can only laminate sheets which are not larger than the press plates. Further, the process is a batch one. Accordingly, the productivity is not high.

SUMMARY OF THE INVENTION

Accordingly, it is the primary object of the present invention to provide a method for lamination, which improves upon the above identified deficiencies.

It is a further object of the present invention to provide such a method for lamination, which can manufacture laminated plate material in a continuous fashion.

It is a further object of the present invention to provide such a method for lamination, which can manufacture laminated plate material pieces which are arbitrarily long.

It is a further object of the present invention to provide such a method for lamination, which can apply pressure and heat for such lamination for a relatively long time.

It is a further object of the present invention to provide such a method for lamination, which can laminate material including synthetic resins which require at least several minutes of heating and pressurization for being molded and laminated.

It is a yet further object of the present invention to provide a device for lamination, which aids with the accomplishment of the above identified objects mentioned above with regard to a method.

According to the most general aspect of the present invention, these and other objects are accomplished by a method for applying pressure and heat to a sheet material from opposite surfaces thereof, wherein: (a) said sheet material is conveyed in through an entrance zone of a pressure vessel, along through an interior zone thereof, and out through an exit zone thereof; (b) said zones of said pressure vessel being substantially filled with a pressure medium; (c) said pressure medium in said interior zone of said pressure vessel being maintained at a temperature and pressure at which said pressure medium is substantially in the liquid phase; and (d) said pressure medium in said entrance and exit zones of said pressure vessel being at least partially maintained at a temperature at which said pressure medium is in the solid phase so as to provide a sealing effect against leakage of said pressure medium out of said pressure vessel and to retain said pressure in said interior zone of said pressure vessel; and by a device for applying pressure and heat to a sheet material, comprising: (a) a pressure vessel formed with an interior space opened to the outside thereof through an entrance opening and an exit opening for passing said sheet material; (b) a means for supplying pressure medium under pressure to said interior space of said pressure vessel; and (c) means for maintaining part of said pressure medium charged in portions of said interior space of said pressure vessel proximate to said entrance and said exit opening thereof at substantially lower temperatures than the temperature of part of said pressure medium charged in a central portion of said interior space of said pressure vessel.

According to such a method and such a device, the above pointed out deficiencies with regard to the prior art are improved upon, and laminated plate material can be manufactured in a continuous fashion. Thereby, it is possible to manufacture laminated plate material pieces which are very long, and in fact which are arbitrarily long. And this method for lamination, as practiced by the device described above, can apply pressure and heat for such lamination for a relatively long time to each individual portion of the surface of the laminate. Thereby, it is possible to laminate by a continuous process material including synthetic resins which require at least several minutes of heating and pressurization for being molded and laminated.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figure; and:

DESCRIPTION OF THE PREFERRED EMBODIMENTS

Figure 1:
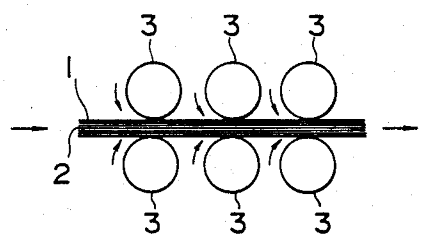
FIG. 1 PRIOR ART
FIG. 1 is a figure relating to the prior art, and shows in a schematic side view a laminating apparatus including a plurality of pairs of pressure rollers.
Figure 2:
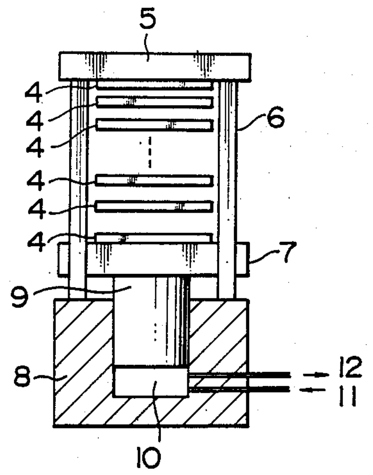
FIG. 2 PRIOR ART
FIG. 2 is another figure relating to the prior art, and shows in a schematic front view a laminating open press.
Figure 3:
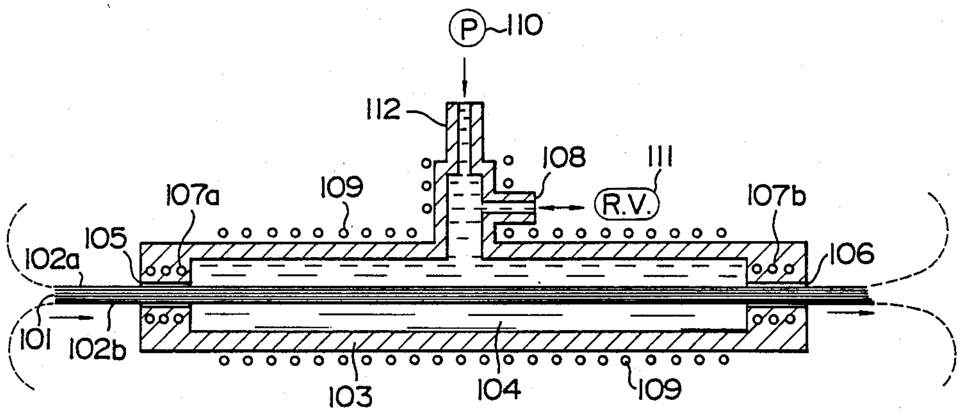
FIG. 3 is a longitudinal cross sectional view illustrating the first preferred embodiment of the device for pressure lamination according to the present invention, for practicing the first preferred method embodiment.

The present invention will now be described with reference to the preferred embodiments of the method and of the device thereof, and with reference to the appended drawings. FIG. 3 is a longitudinal cross sectional view illustrating the first preferred embodiment of the device for pressure lamination according to the present invention, for practicing the first preferred method embodiment. In this figure, the reference numeral 101 denotes a plurality of overlaid sheets of prepreg which are to be laminated together, while the reference numerals **102*a* and 102*b* denote two protective sheets of a material such as for example stainless mirror plate, steel plate, aluminum foil, plastic film, or the like, which are used for protecting the stack 101 of prepregs during the lamination process, and which are laid on either side of said prepreg stack 101. Optionally and desirably, these protective sheets 102*a* and 102*b* are in fact formed into endless bands coming around over the top and below the bottom of the FIG. 3 apparatus, so that they can conveniently be recycled through said apparatus. And 103 is a pressure vessel which constitutes the main body of the pressure lamination device; pressure medium 104 is held in a cavity formed inside said pressure vessel 103**.

On the left side in the figure of the pressure vessel 103 there is formed an entrance opening 105 thereof; this entrance opening 105 is in the form of a slot through the wall of the vessel 103 elongated in the direction perpendicular to the drawing paper in FIG. 3. Similarly, on the right side in the figure of the pressure vessel 103, there is formed an exit opening 106 thereof; this exit opening 106 is similarly in the form of a slot through the wall of the vessel 103 elongated in the direction perpendicular to the drawing paper. Around the entrance opening 105 there is provided a cooling heat exchanger 107*a*, and similarly around the exit opening 106 there is provided another cooling heat exchanger 107*b*. These heat exchangers 107*a* and 107*b* may conveniently be pipe structures through which a cooling medium may be circulated. Around the main body of the pressure vessel 13 there is provided a heating device 109; this heating device 109 may be a pipe structure through which a heating medium can selectively be circulated, or alternatively it may be a electrical heater or the like. An inlet 108 for resupplying the pressure medium 104 is provided, and a relief valve 111 (not particularly shown in detail) controls communication between this inlet 108 and the outside for relieving pressure on the pressure medium 104. A pressure pump 110, also not particularly shown in detail, can selectively pressurize the pressure medium 104 through an aperture 112.

This device for pressure lamination according to the first preferred embodiment of the present invention is operated as follows.

A long sheet of prepreg stack 101 is fed, in between the protective sheets 102*a* and 102*b*, in through the entrance opening 105, through the central cavity of the pressure vessel 103, and out through the exit opening 106. The transverse dimensions (with respect to the direction of motion of the prepreg stack 101) of the entrance opening 105 and of the exit opening 106 are desired to be somewhat larger than the transverse dimensions of the sandwich of the prepreg stack 101 and the protective sheets 102*a* and 102*b*, but to be as small as possible as long as the motion of said sandwich is not impeded. And the longitudinal dimensions of the entrance opening 105 and of the exit opening 106, i.e. their dimensions in the horizontal direction with respect to FIG. 3, are appropriately determined according to the type of pressure medium utilized, so as to be sufficient to provide a good sealing effect, as will be clear from the following descriptions.

While the sandwich of the prepreg stack 101 and the protective sheets 102*a* and 102*b* is thus continuously fed through the pressure vessel 103, the heating device 109 is operated and also the heat exchangers 107*a* and 107*b* are operated. Thereby, the main portion of the pressure medium 104 which is received in the main body of the pressure chamber 103 (which is initially supplied in heated and molten form through the inlet 108) is heated and is thereby melted and kept liquid, while on the other hand the portions of said pressure medium 104 proximate to the entrance opening 105 and the exit opening 106 are cooled and are kept solidified. The temperature of the thus molten portion of the pressure medium 104 is set to be a suitable temperature for lamination of the prepreg stack 101; the material of which the pressure medium 104 is composed is so chosen that it is molten at this appropriate temperature for lamination but is solid at a somewhat lower temperature. And simultaneously the pressure pump 110 is operated so as to pressurize the molten medium 104 within the main body of the pressure chamber 103 to a suitable pressure for lamination of the prepreg stack 101. And the speed of transport of the sandwich of the prepreg stack 101 and the protective sheets 102*a* and 102*b* is set so as to keep each portion of said sandwich including the prepreg stack 101 to be laminated within the pressurized portion of the pressure chamber 103 for an appropriate time for proper lamination of said prepreg stack 101.

While this process is being conducted, the pressure of the molten medium 104 within the pressure chamber 103 is held therein by the solidified portions of said medium 104 which block the entrance opening 105 and the exit opening 106. In the vicinities of these seal portions, the protective sheets 102*a* and 102*b* slide against the solidified portions of the medium 104 and form good seals thereagainst.

Thus, with regard to the material for this pressure medium 104, it is desirable that it should have good lubricating characteristic with regard to the material for the protective plates 102*a* and 102*b*. It should be liquid at the temperature at which it is contemplated to laminate the prepreg stack 101 and should be solid at a somewhat lower temperature. Of course, the material for the pressure medium 104 should be inert with respect to the material for the protective plates 102*a* and 102*b*. And, although the contact between the molten pressure medium 104 and the prepreg stack 101 occurs only at the edge of the sandwich of the prepreg stack 101 and the protective sheets 102*a* and 102*b*, and not always even there, nevertheless said molten pressure medium 104 should not be able to dissolve any component of said prepreg stack 101 including particularly the synthetic resin included therein, and should not be able substantially to permeate said prepreg stack 101. Suitable possible materials for this pressure medium 104 for various applications include lead and its alloys, paraffin wax, and glass.

The material to be laminated is not to be considered as being limited to the type of prepreg material described above. Such materials as sheet molding compound (SMC), sheet wood like material, ceramic green sheet, multi layer circuit board, and so on may conveniently be laminated.

Of these materials, in particular the structural material for a multilayer circuit board is made by overlaying one, or more than one, internal layer circuit boards formed with the desired circuit patterns, over one or both the sides of an insulating base board, with prepreg, and then optionally overlaying therewith one or more circuit boards having circuit patterns on one or both sides thereof, one or more laminated plates having copper foil circuit patterns on one side thereof, and copper foil. The one sided circuit board(s) and the laminated plates with copper foil circuit patterns are overlaid in such a manner that their circuit patterns and the copper foil surface(s) face outwards.

The laminated and molded material formed as explained above according to the present invention may be of very great length or may be cut into appropriate lengths. Further, the material to be sandwiched between the protective sheetse 102*a* and 102*b* may be a combination of sheet materials and granular or pulverized materials or may only be granular or pulverized material.

Thus it is seen that, according to the method and device of the present invention, the previously identified deficiencies with regard to the prior art are improved upon, and laminated plate material can be manufactured in a continuous fashion. Thereby, it is possible to manufacture laminated plate material pieces which are very long, in fact arbitrarily long. And this method for lamination, as practiced by the device disclosed, can apply pressure and heat for such lamination for a relatively long time to each individual portion of the surface of the laminate. Thereby, it is possible to laminate by a continuous process material including synthetic resins which require at least several minutes of heating and pressurization for being molded and laminated.

Figure 4:
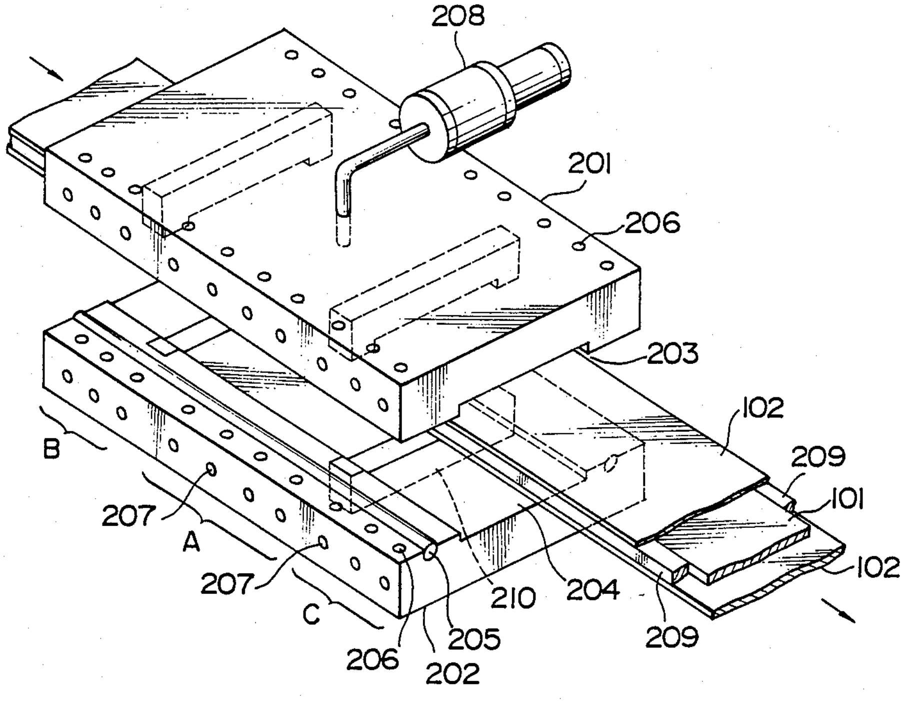
FIG. 4 is a perspective view showing the second preferred embodiment of the device according to the present invention, which practices the second preferred method embodiment.

In FIG. 4, there is shown in perspective view a second preferred embodiment of the device according to the present invention, which practices a second preferred method embodiment. The pressure vessel of this device is formed in two portions: an upper portion 201 and a lower portion 202. Each of these portions is made by forming a depression in the central portion of a steel plate of a per se known sort, and the pressure vessel is constituted by securely clamping the portions 201 and 202 together (by bolts, not shown, which are passed through bolt holes 206) with the interposition of a sealing gasket 205. A plurality of conduits 207 are formed through the upper and lower pressure vessel portions 201 and 202 for conducting heating medium such as steam to the main heating and pressurizing zone, which is denoted in FIG. 4 by "A", of said pressure vessel, and also for conducting cooling medium such as water to the entrance and exit sealing zones, denoted by "B" and "C" respectively, thereof, analogously to what was done in the case of the first preferred embodiment described above. Thus, the heating over the zone A of the pressure vessel, and the cooling over the zones B and C thereof, are performed relatively uniformly and smoothly over each individual zone. Heat insulation elements such as shown by 210 are fitted within the internal cavity of the pressure vessel, so as to at least partially divide the zone A from the zones B and C; these elements 210 may preferably be made of a heat insulating material such as asbestos board made by molding asbestos with phenol resin, thermosetting resin laminate plate, or the like, and they may be somewhat set into the steel plate which constitutes the upper and lower pressure vessel portions 201 and 202. 208 is a pump for introducing the molten pressure medium into the interior of the pressure vessel and for pressurizing it.

As before, 101 denotes a stack of prepreg sheets and 102*a* and 102*b* are upper and lower protective plates. Again, it is considered desirable that the upper and lower protective plates 102*a* and 102*b* should be formed as endless belts so as to be recycled smoothly. In order as much as possible to prevent the pressure medium from coming into contact with the prepreg sheet stack 101, the upper and lower protective plates 102*a* and 102*b* are formed somewhat wider than the stack 101, and a packing or gasket 209 is interposed on each side of said stack 101 between the plates 102*a* and 102*b*. Again, it is considered desirable that the packings 209 should be formed as endless belts so as to be recycled smoothly. As suitable materials for the packings 209, there may be utilized silicone rubber, fluoride rubber, polyethylene, or the like.

This apparatus is operated similarly to the FIG. 3 apparatus: the depths of the depressions 203 and 204 in the upper and lower pressure vessel portions 201 and 202 are so chosen that the prepreg stack 101 sandwiched between the upper and lower protective plates 102*a* and 102*b* can smoothly pass, not only through the heating and pressurization zone A wherein the pressure medium is kept molten by the heating medium which is being passed through the conduits 207 around this zone A, but also through the entrance and exit zone B and C wherein the pressure medium is kept solidified by the cooling medium which is being passed through the conduits 207 around these zones B and C. The molten pressure medium in the zone A is kept under pressure by the operation of the pump 208 to resupply a certain quantity of pressure medium into the pressure vessel; this is required because inevitably a certain amount of said pressure medium is carried in fractured form out from the exit zone B by the sandwich of the prepreg 101 and the protective plates 102*a* and 102*b*.

Figure 5:
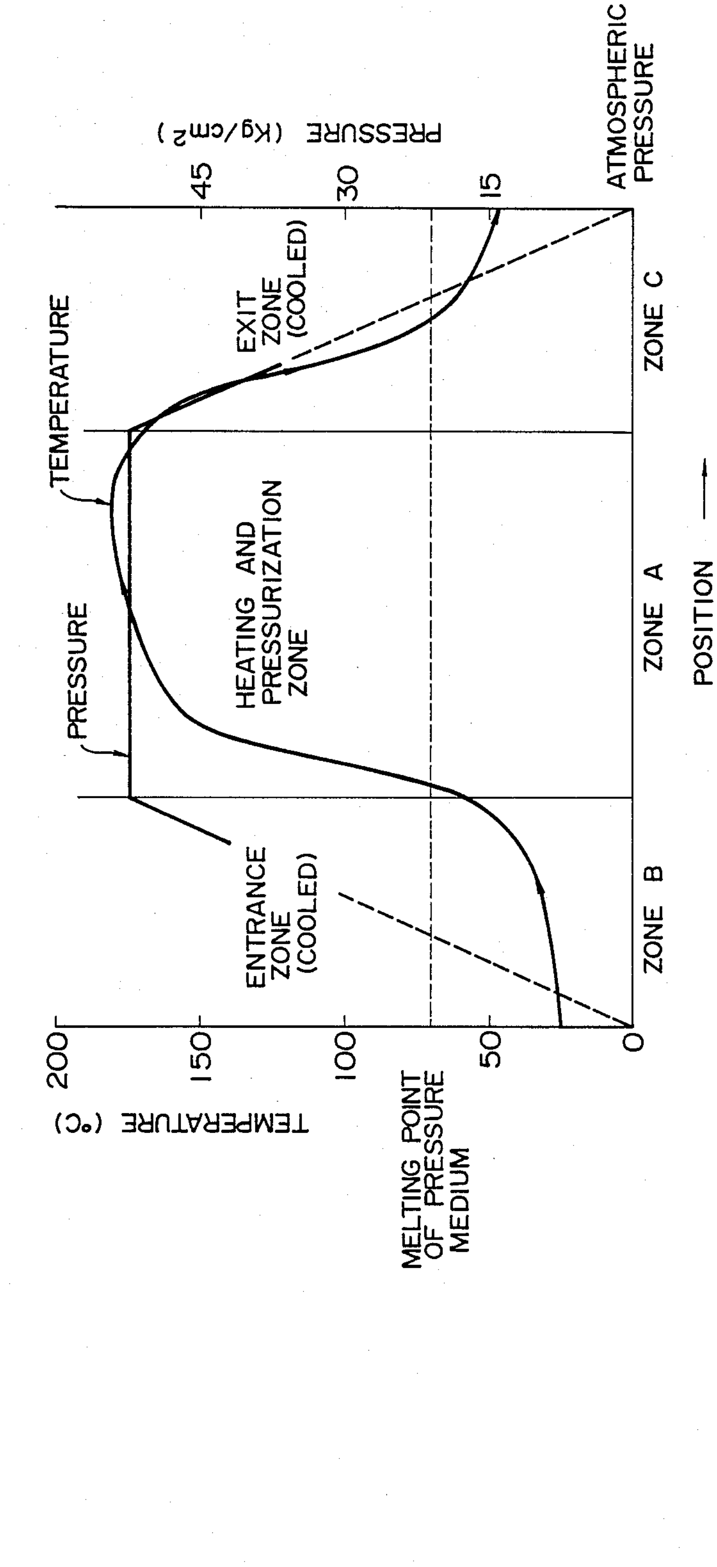
FIG. 5 is a combined graph for showing the variation of both the temperature and the pressure applied to a representative surface portion of a prepreg sandwich as it travels through the FIG. 4 device in succession through three zones A, B, and C.

The substance used for the pressure medium may be, for example, industrial wax, and the time period required for a point on the sandwich of the prepreg and the protective plates to pass through the heating and pressurization zone A may be of the order of five or ten minutes, although of course the ideal value therefor depends upon the particular type of synthetic resin that is being used in the prepreg. In FIG. 5, there is shown a combined graph for both the temperature and the pressure of the pressure medium or those applied to a representative surface portion of the prepreg sandwich as it travels through the FIG. 4 device in succession through the three zones B, A, and C; in this graph, the position of said representative surfaces portion is shown along the horizontal axis. It will be understood from this graph that: first the prepreg sandwich passes into the B zone, in which the pressure applied to it is gradually increased while the temperature also increases, until said temperature reaches the melting point of the pressure medium; and thereafter as the sandwich reaches and enters the A zone the pressure remains substantially constant while the temperature increases further and then remains substantially constant as the sandwich transverses the A zone and the prepreg stack 101 is laminated therein; and then as said sandwich reaches and enters the C zone the pressure and temperature applied to it both decline gradually, until the pressure reaches substantially zero as the sandwich departs from the C zone to the outside of the apparatus.

Figure 6:
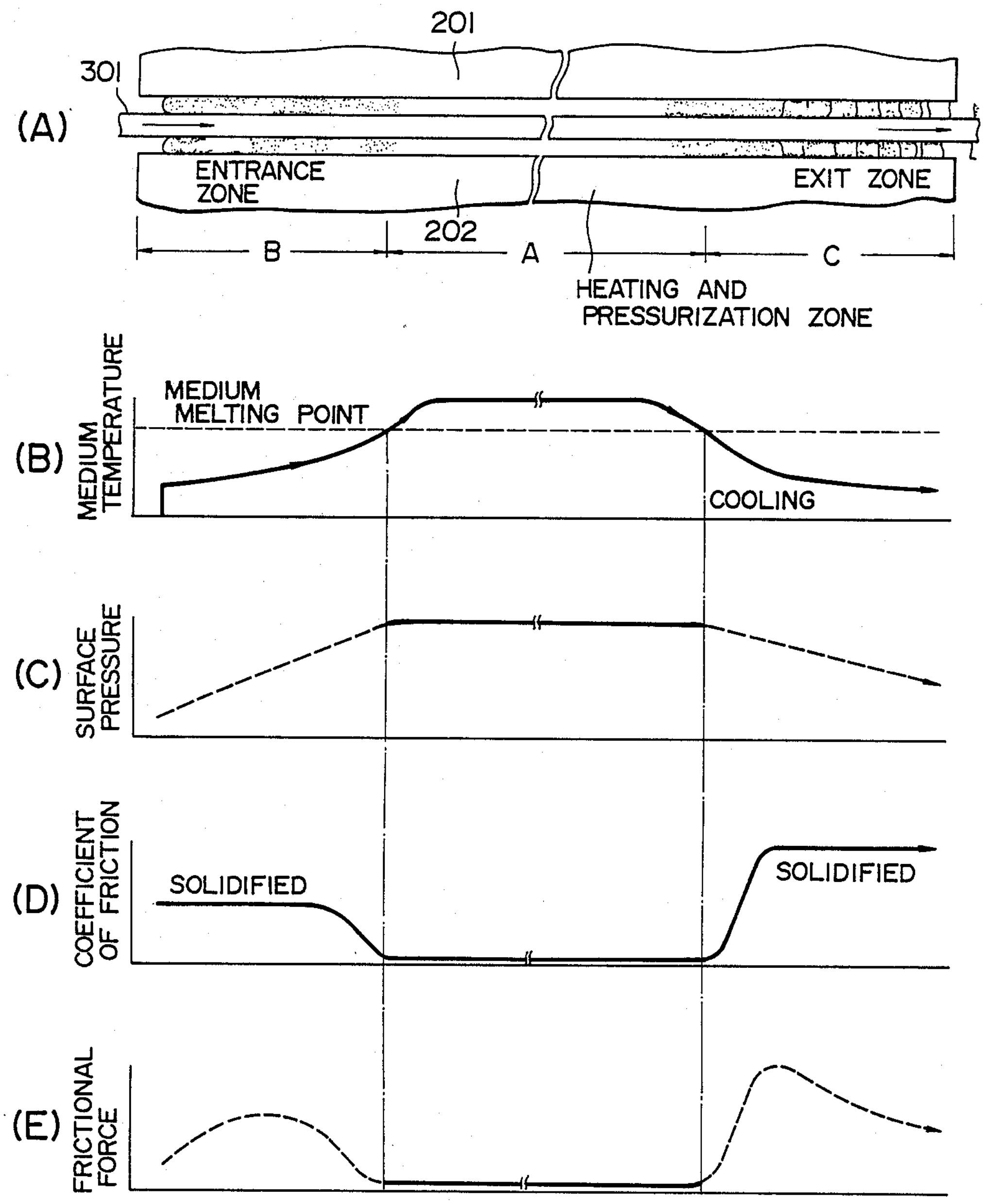
FIG. 6 is a set of graphs, this time relating the temperature of the pressure medium, the pressure of said pressure medium, the coefficient of friction between said medium and the prepreg sandwich, and the frictional force between the same, to position along the longitudinal axis of the FIG. 4 apparatus, in the case of another example of practice of the method of the present invention.

In FIG. 6, there are shown a further set of graphs, this time relating the temperature of the pressure medium, the pressure of said pressure medium, the coefficient of friction between said medium and the prepreg sandwich, and the frictional force between the same, to position along the longitudinal axis of the FIG. 4 apparatus, in the case of another example of practice of the method of the present invention. The apparatus itself is shown in longitudinal sectional view in FIG. 6A, and the prepreg sandwich moves in the direction from the left to the right of this figure. Here, the sandwich of the prepreg and the protective plates is denoted by the reference numeral 301, while the upper and lower pressure vessel portions are again denoted as 201 and 202.

FIG. 6B shows the temperature of the medium in the pressure vessel as related to position along the longitudinal direction thereof, and demonstrates that said medium is below its melting point and is therefore solid in the entrance zone B and in the exit zone C, while being molten in the heating and pressurization zone A; and at the transition regions between the entrance zone B and the exit zone C, and the heating and pressurization zone A, the medium is semi-solid; it is thought that it is here that the best pressure sealing effect is in fact obtained.

FIG. 6C shows the pressure of the medium in the pressure vessel or the pressure applied to the surface of the prepreg sandwich as related to position along the longitudinal direction thereof, and demonstrates that said pressure is substantially constant and maximal in the heating and pressurization zone A, while dropping gradually from said zone A through the entrance zone B and the exit zone C. In detail, at the very entrance to the entrance zone B, the pressure medium is solid and the pressure applied to the surface of the prepreg sandwich is rather unstable but very low, and as soon as the entrance zone B is fairly penetrated the pressure medium gradually becomes fluid and the pressure stabilizes and rises smoothly. Equally, at the very exit of the exit zone C, the pressure medium is solid and may be actually breaking up to some extent as suggested in FIG. 6A, and accordingly again its pressure becomes rather unstable but in any event very low.

FIG. 6D shows the coefficient of friction between the pressure medium and the prepreg sandwich, as related to position along the longitudinal direction of the pressure vessel, and demonstrates that said coefficient of friction is substantially constant and maximal over the parts of the entrance zone B and the exit zone C in which said medium is solidified, while said coefficient of friction drops in the transition regions from said entrance zone B and exit zone C to the heating and pressurization zone A as the medium starts to liquefy, and becomes substantially zero in said heating and pressurization zone A where the medium is substantially completely melted. It should be noted that in the exit zone C the coefficient of friction between the pressure medium and the prepreg sandwich is somewhat greater than in the entrance zone B, because as the prepreg sandwich departs the heating and pressurization zone A the medium solidifies on its outer surface and tends to adhere thereto.

Finally, FIG. 6E shows the actual frictional force per unit of area between the pressure medium and the prepreg sandwich, as related to position along the longitudinal direction of the pressure vessel; thus, the value shown in this graph is the product of the values in the FIG. 6C graph and in the FIG. 6D graph. This graph demonstrates that in the entrance zone B the solidified pressure medium receives a force which tends to pull it into the pressure vessel, while on the other hand in the exit zone C the solidified pressure medium receives a force which tends to pull it to the outside of the pressure vessel. As intimated earlier, this causes some of the solidified medium in the zone C to become fractured and to be carried out of the apparatus. Therefore it is necessary to supply a certain corresponding amount of pressure medium by the pump 208; this may conveniently be obtained by recycling the taken out solidified medium along with supplementation of any deficiency thereof.

Figure 7:
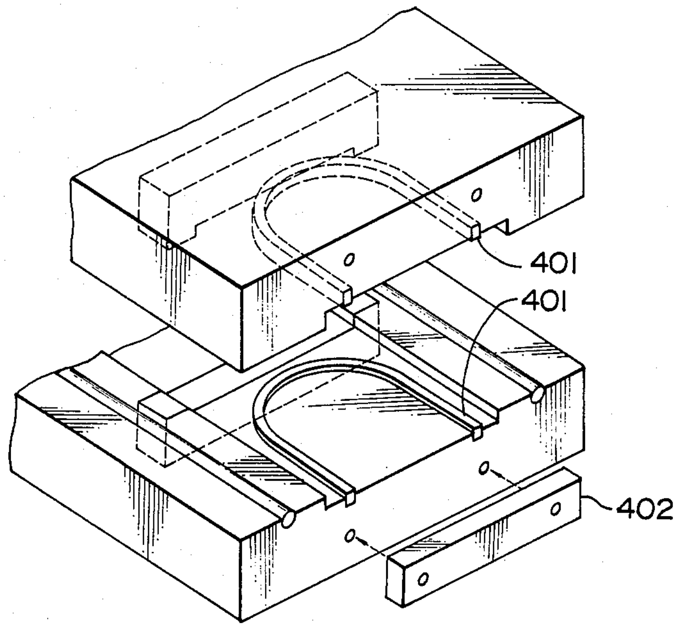
FIG. 7 shows in an enlarged and exploded perspective view a sealing construction utilized in a further variant device embodiment.
Figure 8:
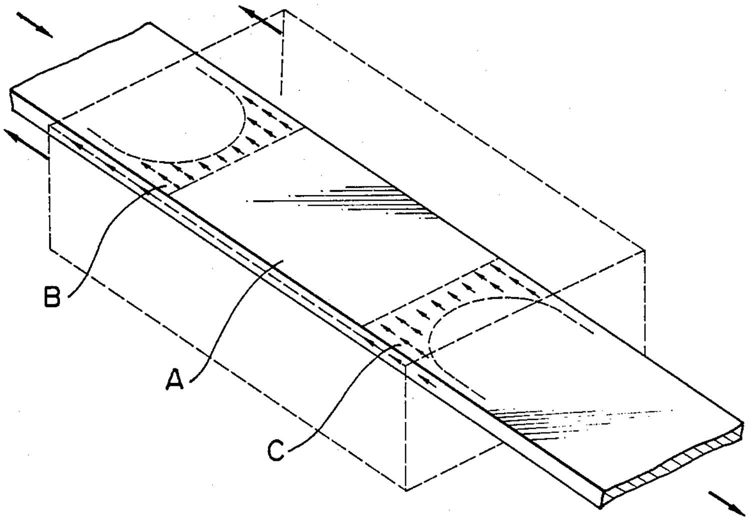
FIG. 8 is a schematic perspective view showing the entire said variant device embodiment, which incorporates two sealing constructions of the FIG. 7 type, and further shows the pattern of frictional forces developed during practice of the laminating method according to the present invention thereby.

In FIGS. 7 and 8, a modification of the FIG. 4 embodiment is shown in perspective view. In this preferred embodiment, additionally mechanical sealing constructions are provided both at the entrance zone B and at the exit zone C. FIG. 7 shows one of these sealing constructions in enlarged an exploded perspective view, while FIG. 8 shows the entire laminating device in schematic perspective view. In FIG. 7, the reference numeral 401 denotes a seal member, formed into a semicircular shape with straight extensions, which is fabricated from a heat resistant and pressure resistant elastic material such as for example silicon rubber, fluoride rubber, polyethylene, or the like, and 402 is a retainer for said seal member. This seal member 401 seals well against the flat surface of the prepreg sandwich, and this can be effective even although the prepreg sandwich surface is moving. However, it is much more difficult to provide any type of mechanical sealing construction against the edge portion of the prepreg sandwich, and accordingly the sealing effect of the solidification of the pressure medium must be relied upon for providing this seal.

In FIG. 8, there is shown the magnitude of the frictional force for each small unit area of the surface of the prepreg sandwich, when such a mechanical seal as 401 is utilized at both of the entrance and exit zones B and C. Because of the shown curved shape of the seal members 401, in the central portion (in the transverse direction) of the prepreg sandwich the pressure medium is sealed off at a point which is closer to the heating and pressurization zone A, than in the edge portions of said prepreg sandwich. In this zone A, the pressurized medium is liquid, and the frictional force is accordingly small. The pressure medium is sealed off at points which become further and further away from the heating and pressurization zone A, the closer one gets to the edges of the prepreg sandwich, and accordingly the frictional force is increased in these areas. And, since the side edges of the prepreg sheet are not mechanically sealed off at all, the pressure medium is completely solidified at the extreme edges of the entrance and exit zones B and C, and the frictional force at these portions is accordingly high. Since these portions where the frictional force is high are limited to the side edge portions where mechanical sealing cannot be easily attained, and since the central flat portion, which can be easily mechanically sealed, will not cause high frictional force because of the use of the mechanical seal, it is ensured that the force required to convey the prepreg sandwich can be reduced. Further, since as remarked above the frictional force at the exit zone C is somewhat higher than that at the entrance zone B (as shown in FIG. 6D), it is particularly effective to use such a mechanical seal at said exit zone C. There may be some seepage or leakage of the pressure medium from the mechanical seal at the central portion of the prepreg sandwich, but since this will be relatively minor it can be coped with by resupply of pressure medium by means of the pump 208 (cf. FIG. 4), and no problem need arise therefrom.

Figure 9:
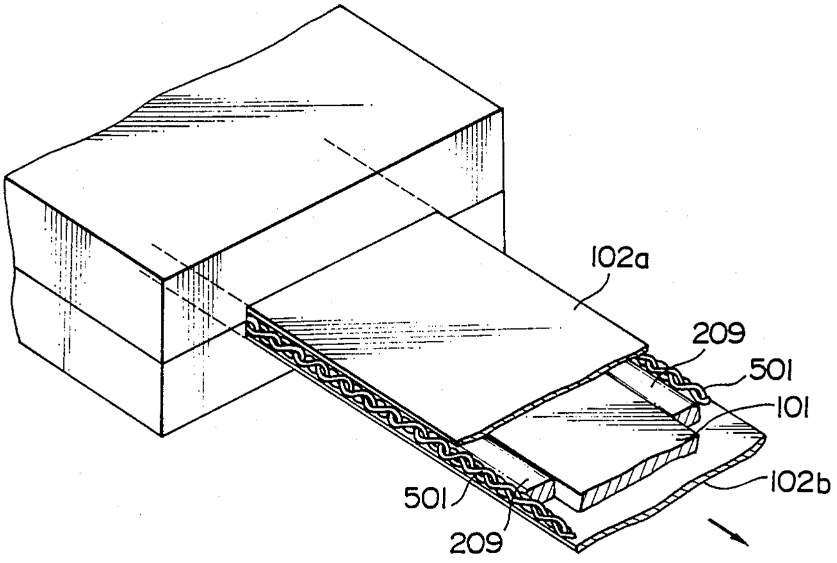
FIG. 9 is a partly cut away perspective view showing a further modification of the FIG. 4 device and method embodiments, in which a special type of sealing arrangement including endless chains is provided for the edge portions of the prepreg sandwich.

In FIG. 9, there is shown in partly cut away perspective view a further modification of the FIG. 4 device and method embodiments, in which a special type of sealing arrangement is provided for the edge portions of the prepreg sandwich.

As shown in FIG. 4, this sandwich is constituted largely by a stack 101 of prepreg sheets of a certain transverse width, held between upper and lower protective stainless steel plates **102*a* and 102*b* of somewhat greater transverse widths; and a packing or gasket 209 is interposed on each side of said prepreg sheet stack 101 between the plates 102*a* and 102*b*. As mentioned with regard to FIG. 4, both the protective stainless steel plates 102*a* and 102*b* and also the packings 209 are preferably desired to be formed as endless loops. The provision of these packings 209 is very important for preventing the molten and pressurized pressure medium from coming into contact with the edges of the prepreg stack 101, because, if this were undesirably to occur, the edge of said prepreg stack 101 might become contaminated or chemically reacted with, and some pressure medium might enter between the superposed prepreg sheets in said stack 101, thus necessitating that the edges of the final laminated product would be required to be cut away therefrom. However, by providing the packings 209, such contamination and chemical reaction of the prepreg stack 101 can be avoided, and proper pressure and temperature can be provided over the entire prepreg sheet stack 101**.

However, the packing arrangement of FIG. 4 has the following problems. Specifically, the packings 209 may be subjected to damage on their outer surfaces due to friction against the pressure medium, especially in the zones B and C in which the pressure medium is solidified; and accordingly the packings 209 cannot be expected to endure a long service life. Further, the seam portions of such endless packings 209 tend to break. Also, the sealing effect may be impaired due to slippage between the packings 209 and the prepreg sandwich as the packings 209 are pulled by the solidified pressure medium, in the zones B and C. Other problems may occur.

In order to eliminate these problems, in the FIG. 9 construction, on the outside of each of the packings 209, between the edge portions of the protective stainless steel plates **102*a* and 102*b*, there is provided a chain 501 of a relatively small pitch; again, these two chains 501 may preferably be endless chains. These chains 501 do not prevent the actual material of the pressure medium from reaching the packings 209, but they do prevent undue forces from acting on said packings 209. In other words, the breaking up of the solidified pressure medium which occurs in the exit zone C occurs between the outer sides of these chains 501 and the wall of the pressure vessel confronting thereto, and does not reach so far inwards as to the outer sides of the packings 209, due to the mechanical reinforcement of the solidified pressure medium provided by the chains 501. Thereby, the above outlined problems are avoided, and the packings 209 are assured of a relatively long service life. However, instead of chains such as the chains 501, other forms of mechanical reinforcement and support which can prevent the breakage of the pressure medium which has solidified on the outside of the packings 209** can be utilized—for example, steel, copper, or lead bands, or fabrics made of such metals, are suitable.

Although the present invention has been shown and described with reference to the preferred embodiments thereof, and in terms of the illustrative drawings, it should not be considered as limited thereby. Various possible modifications, omissions, an alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A method for applying pressure and heat to a laminated sheet material from opposite surfaces thereof, wherein:

(a) said sheet material is conveyed in through an entrance zone of a pressure vessel, along through an interior zone thereof, and out through an exit zone thereof;

(b) said zones of said pressure vessel being substantially filled with a pressure medium;

(c) said pressure medium in said interior zone of said pressure vessel being maintained at a temperature and pressure at which said pressure medium is substantially in the liquid phase;

(d) said pressure medium in said entrance and exit zones of said pressure vessel being at least partially maintained at such a temperature at which said pressure medium is in the solid phase as to provide a sealing effect against leakage of said pressure medium out of said pressure vessel through said entrance and exit zones and to retain said pressure in said interior zone of said pressure vessel, and to provide a small rate of leakage of said pressure medium from said exit zone in discontinuously broken forms; and (e) protective sheets being provided over opposite surfaces of said laminated sheet material and wherein; an additional sealing effect is provided in at least one of said entrance and said exit zones of said pressure vessel against face portions of said protective sheets on opposite surfaces of said sheet material by providing an additional sealing member to slide there against, and to retain said pressure medium in said interior zone of said pressure vessel.

2. A method according to claim 1, wherein said solidified pressure medium in said entrance and exit zones of said pressure vessel also provides a sealing effect at opposite edge portions of said sheet material.

3. A method according to claim 1, wherein said sealing member is curved so as to reduce the longitudinal extent of said zone of said pressure vessel in which it is fitted, in the transversely central portion of said sheet material, as compared to the transversely edge portions of said sheet material.

4. A method according to claim 1, wherein said pressure medium in said interior of said pressure vessel is resupplied by a supply means, as portions of the pressure medium are entrained and pulled out through said exit zone by said sheet material.

5. A method for applying pressure and heat to a laminated sheet material from opposite surfaces thereof, wherein:

(a) said sheet material is conveyed in through an entrance zone of a pressure vessel, along through an interior zone thereof, and out through an exit zone thereof;

(b) said zones of said pressure vessel being substantially filled with a pressure medium;

(c) said pressure medium in said interior zone of said pressure vessel being maintained at a temperature and pressure at which said pressure medium is substantially in the liquid phase;

(d) said pressure medium in said entrance and exit zones of said pressure vessel being at least partially maintained at such a temperature at which said pressure medium is in the solid phase as to provide a sealing effect against leakage of said pressure medium out of said pressure vessel through said entrance and exit zones and thereby retaining said pressure in said interior zone of said pressure vessel, and to provide a small rate of leakage of said pressure medium from said exit zone discontinuously broken forms; and (e) protective sheets being provided over the opposite surfaces of said sheet material, said sheet material including a plurality of overlaid sheets impregnated with a synthetic resin to be laminated together which are located between said protective sheets; said pressure medium applying pressure to said protective sheets to effect pressure lamination of said overlaid sheets.

6. A method according to claim 5, wherein the edges of said sheet material are sealed by inserting longitudinally extending packings between edge portions of said protective sheets.

7. A method according to claim 6, wherein said packings are protected by inserting longitudinally disposed non-packing elements between the edge portions of said protective sheets adjacent to an outer exposed portion of said packing.

8. A method according to claim 7, wherein said longitudinally disposed non-packing elements are chains.

9. A method for lamination according to claim 5, wherein said protective sheets are formed as endless bands and wherein said bands are continuously moved at a rate equal to a conveying speed of said sheet material.

10. A method for lamination according to claim 6, wherein said packings are formed as endless bands and wherein said packings are continuously moved at a rate equal to a conveying speed of said sheet material.

11. A method for lamination according to claim 7, wherein said longitudinally disposed elements are formed as endless elements and wherein said endless elements are continuously moved at a rate equal to a conveying speed of said sheet material.

12. A method for lamination according to claim 1, wherein said pressure medium comprises lead, alloys thereof, paraffin wax or glass and wherein said pressure medium is heated in said interior zone and is cooled in said entrance and exit zones of said pressure vessel.

13. A method according to claim 1, further comprising separating the protective sheets from the laminated sheet material exiting from said exit zone.

* * * * *